Patented Nov. 18, 1941

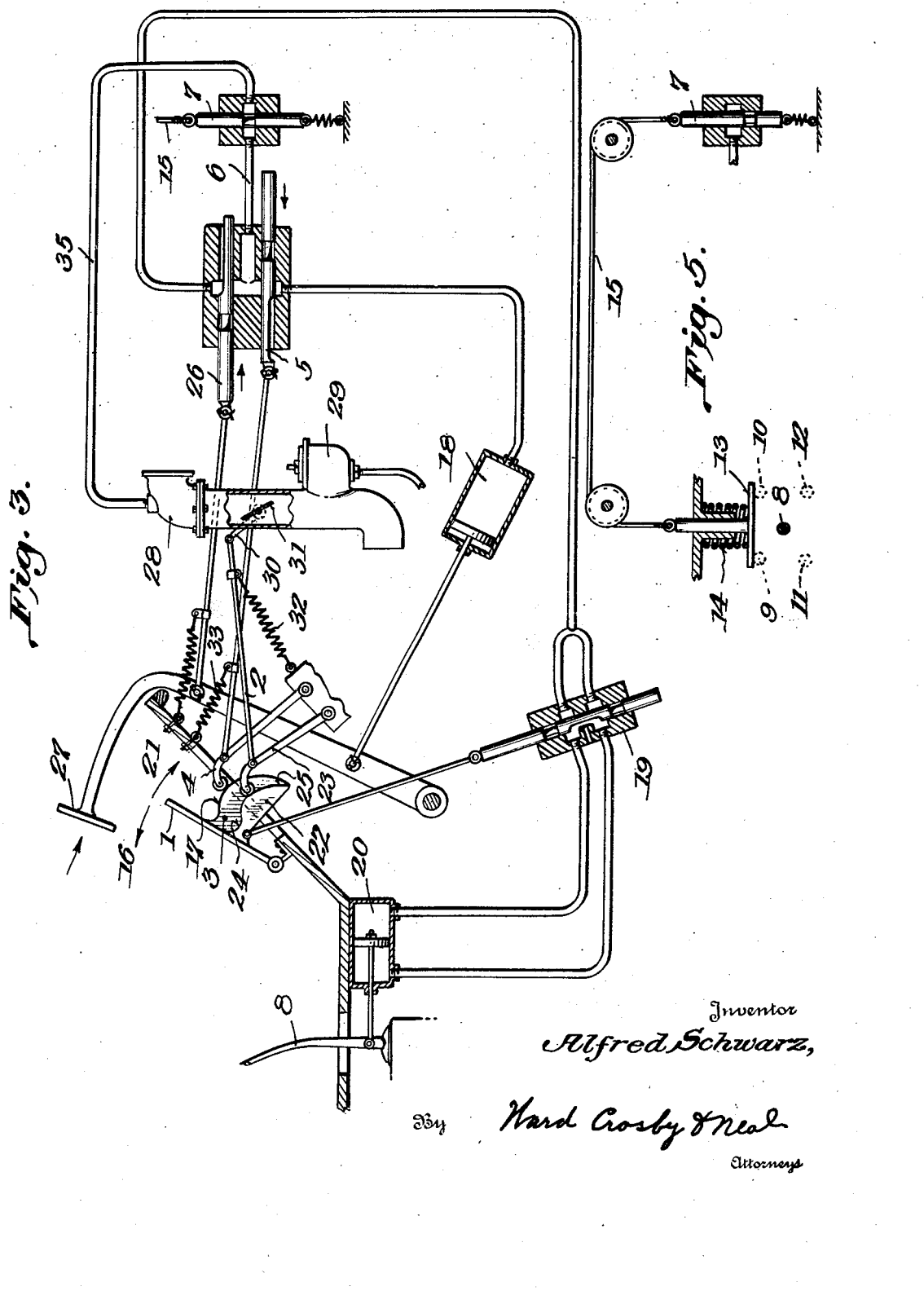

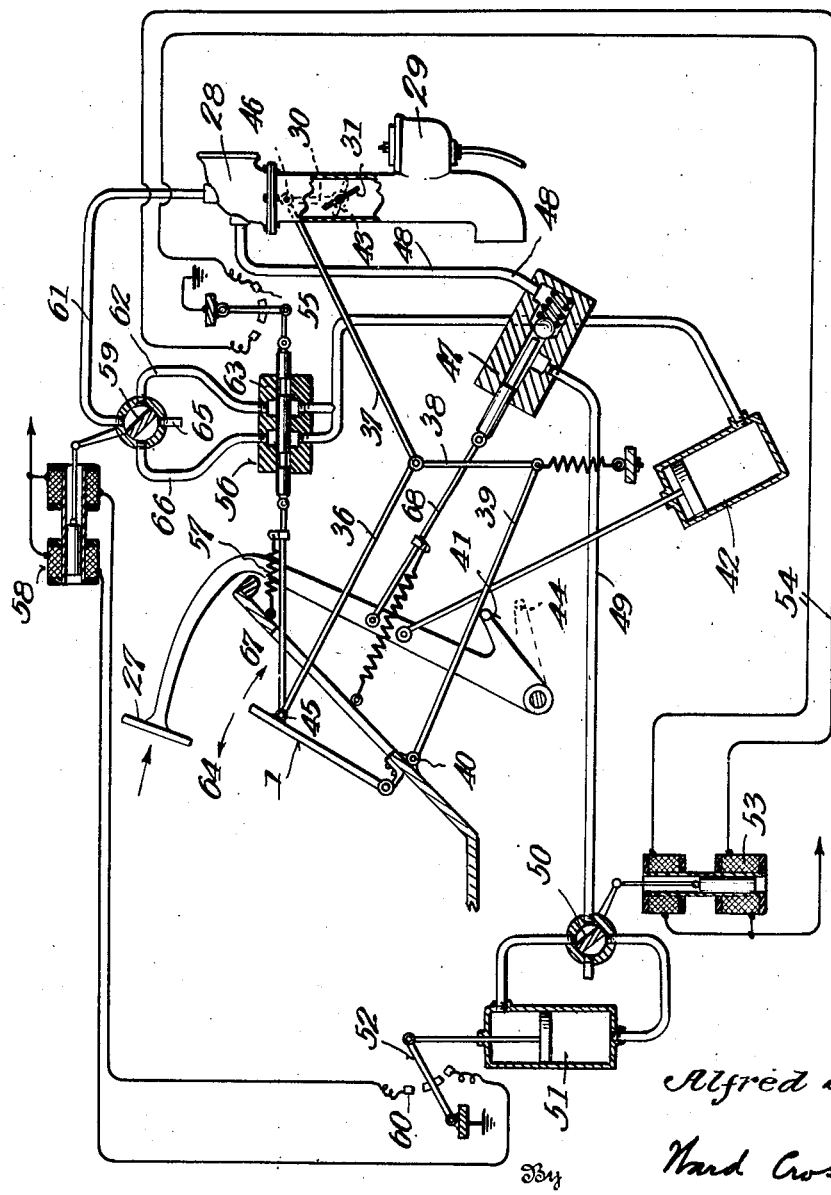

2,263,400

UNITED STATES PATENT OFFICE 2,263,400

AUTOMATIC GEAR SELECTOR

Alfred Schwarz, Ridgewood, N. J., assignor to Automotive Economy Corporation, Jersey City, N. J., a corporation of Delaware Application July 21, 1938, Serial No. 220,517

6 Claims. (Cl. 192—.01)

In the operation of a motor vehicle of present design, the H. P. required on level road, and under ordinary driving conditions, is relatively small, compared with the reserve H. P. that has to be carried, which reserve H. P. is used for acceleration and hill climbing.

The gearing used conventionally is a compromise between light level road work, hill climbing, and acceleration. For example: the vehicle is designed so that acceleration can be obtained without gear shift, approximately from 10 miles per hour, to 60 miles per hour, in 28 seconds, on level road. Of course there are considerable variations on different vehicles, but it is quite necessary to have sufficient acceleration for present day traffic to manipulate a vehicle advantageously without gear shift. It is for this reason that the compromised gearing is used, which is much too low for good economy, just to accommodate acceleration.

It is the object of the present invention, to provide means to operate a motor car at a more economical fuel consumption, and still have ample power for quick acceleration. The present invention contemplates to incorporate into a single control pedal, such as is at present used to control the motor throttle, the gear shift as well, so that with a single up and down motion of the foot, the power is increased or decreased for normal driving. It is furthermore increased without further attention of the driver, by extending the downward motion of the foot pedal (when maximum power in that particular gear is reached) to shift into another gear, thereby increasing the power, by increasing the motor speed relative to the driving wheel. However, when the period is over, when increased power is required, the motor must be operated again at its economical speed, (relative to the rear wheels) without attention of the driver, since such attention to mechanical details is undesirable, and if neglected will result in uneconomical operation of the vehicle.

Figure 1:
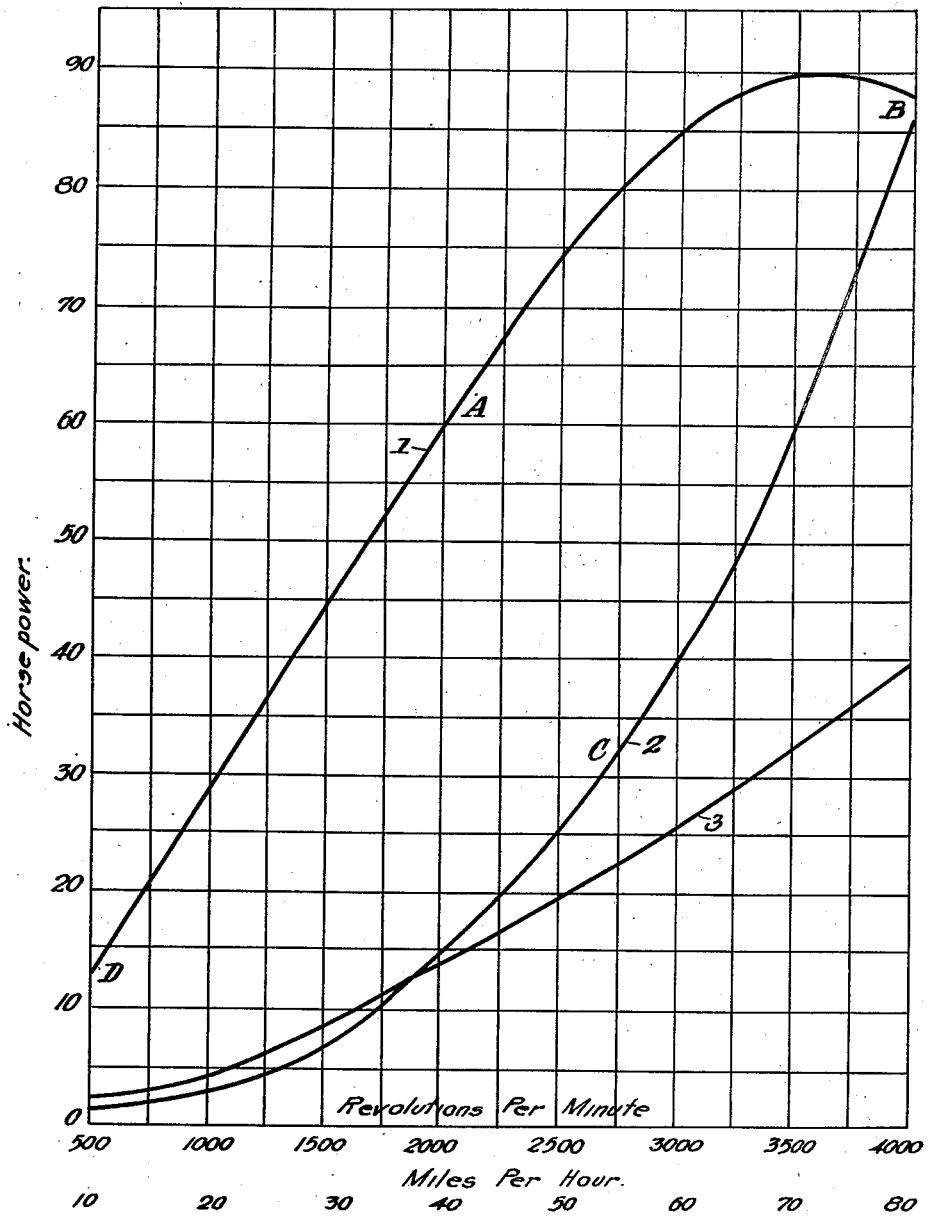
Figure 2:
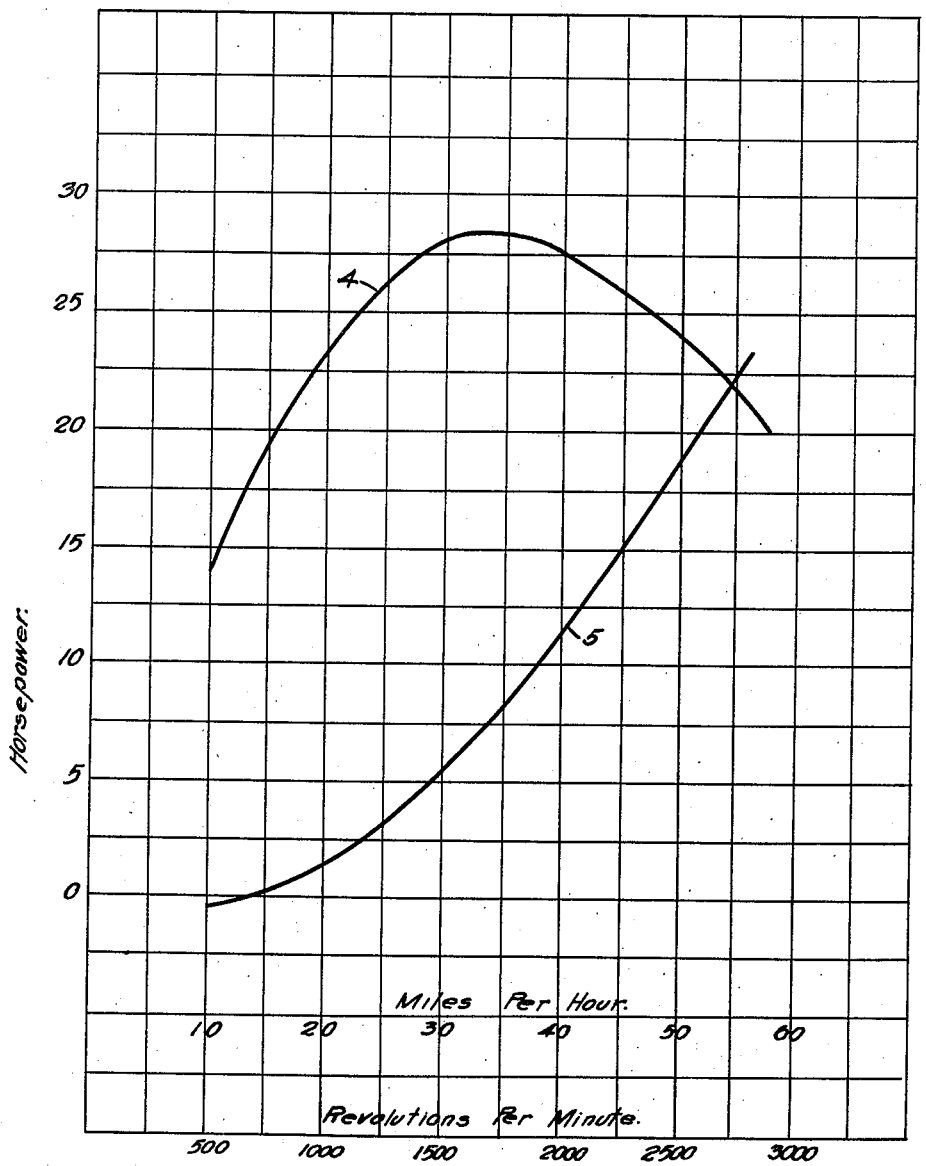

In the drawings, Fig. 1 shows diagrammatically the relative power required for level road operations, and the available power at different motor R. P. M. Fig. 2 shows a characteristic brake H. P. curve, and friction H. P. curve showing that with increased motor R. P. M. the brake H. P. reaches a peak, and after the peak it falls off again, which falling off indicates uneconomical operation of the motor, which the present invention aims to avoid. Fig. 3 shows a mechanical means to carry out the invention, and Fig. 4 shows another mechanical means to carry out the invention in an entirely different way. Both of them however show means to operate the motor throttle and gear shift co-related, thereby shifting into high gear at low power requirements, and into low gear at high power requirements.

Fig. 5 shows a main vacuum valve operated from two speed positions, shutting off all automatic operations when the gear shift is in low and reverse. This is a detail not shown in Fig. 3, to avoid making this figure too complicated.

Fig. 1 shows the brake H. P. of an engine (line 1) at full throttle setting; and the approximate level road requirements (line 2) of an automobile weighting about 3000 lbs. inclusive load; and (line 3) shows the friction H. P. of that particular motor.

Fig. 2 (line 4) shows the H. P. of the same motor at approximately ¼ throttle setting, the throttle was locked in position, and the output at 500 R. P. M. was about 14 H. P. That was all the motor could carry at that R. P. M. The load was then reduced, which automatically increased the speed, which increased the H. P. at 1000 R. P. M. to approximately 23 H. P. At 1500 R. P. M. the power rose to about 26 H. P. It reached a slightly higher power at 1750 R. P. M. and fell rapidly from there on with increased R. P. M. Line 5 represents the friction H. P. and it may be seen that said friction H. P. increased rapidly after 1750 R. P. M. was reached. It is obvious that the friction H. P. exercised a strong influence upon the brake H. P. It is quite clear that at all speeds the motor is making the brake effective H. P. plus its own friction H. P. so that the indicated H. P. if an indicator were used, would be, at 2700 R. P. M. approximately equal to twice the brake effective H. P. In other words, the motor would at this point develop approximately 22.4 brake effective power H. P. plus 22.4 friction H. P. which would be a total of 44.8 H. P. Whereas, at 1750 R. P. M. the motor develops 26.2 brake effective H. P. while the friction H. P. is only 11. This would mean that the motor develops a total of 26.2 H. P. plus 11 H. P. or a total of 37.2 H. P. Assuming that the specific fuel consumption were .5 lb. per indicated H. P. we would then have at 2700 R. P. M. a fuel consumption of 22.4 lbs. total per hour, while we will have at 1750 R. P. M. a fuel consumption of 18.6 lbs. The fuel consumption would be a little more than three-fourths that of the higher speed, although the motor developed a great deal more brake effective H. P. at the slower speed.

Figuring the fuel consumption on the basis of brake effective H. P. we have then in the case of the higher speed, 22.4 lbs. developing 22.4 brake effective H. P. with a fuel consumption of 22.4 lbs. or 1 lb. per brake effective H. P. Whereas, in the case of the lower speed, the motor developed 18.6 lbs. or the specific fuel consumption per of 18.6 lb. or the specific fuel consumption per H. P. hour was .739 lb. so that in round figures the fuel consumption was less than three-fourths in the case of the lower speed, and more H. P. was also delivered as compared with the motor operated at the higher speed. It is therefore obvious that H. P. for H. P. it is much more economical to operate the motor at lower speed, because there is more power available at much less fuel consumption.

Fig. 1 shows as previously stated, the available H. P. of this motor, and the level road requirements. That particular automobile was geared at 4.11 revolutions of the motor to 1 revolution of the rear axle in high gear, which resulted in a speed recorded in the drawing, namely, 500 motor revolutions to 10 miles per hour, 1000 revolutions to 20 miles per hour, etc. As long as the car remains in high gear, and there is no slipping of the wheels on the road, that is a fixed relation which cannot be altered.

That particular car, as may be seen in Fig. 1 at 20 miles per hour, requires about 4 H. P. on level road, and the motor revolutions are 1000 per minute. It may be readily seen by observing the friction H. P. (line 3) that the friction H. P. is a little higher than the useful consumed power, so that as explained previously, these specific fuel consumptions cause about twice the fuel consumption that was necessary, because the motor could have made up to 12 H. P. at 500 R. P. M. with a friction H. P. of only 2 H. P. which would have brought the specific fuel consumption correspondingly down.

In the example on page 1 it was assumed that the specific fuel consumption per indicated H. P. would be the same. However, 5 lbs. per H. P. hour is really approximately the lowest fuel consumption over the entire operating range of the motor. In many throttle positions and speed ranges this fuel consumption is higher, depending largely upon the filling of the cylinder which in turn determines the compression pressure which again results in slower or faster burning. When the throttle is partially closed, the compression pressure is reduced, and when the speed becomes faster than the intake mechanism can handle it the volumetric efficiency again becomes low and the compression pressure is consequently low. Roughly speaking, in an automobile motor the highest volumetric efficiency occurs between 1500 and 2500 R. P. M. and either below or above these figures specific fuel consumption increases, and while it is not possible to eliminate this in the low speed range, it should be avoided by properly gearing the motor so that it does not operate unnecessarily in the high speed range. It is the object of the present invention to provide a gearing which automatically adapts itself to the most economical operation of the motor. This object is accomplished by operating the motor with a suitable cam motion controlling the throttle of the carburetor and another cam motion operated in conjunction and in fixed relation with a specially designed gear shifting mechanism.

As may be seen in Fig. 1 where line 1 indicates a maximum H. P. capacity of the motor, and line 2 indicates the approximate level road requirements of power to propel the vehicle. The area between A—B—C and D represents the power margin for acceleration and hill climbing. The condition illustrated in Fig. 1 illustrates the conventional condition in high gear. When a lower gear is applied, this power margin is increased, by allowing the motor to run faster, in other words changing the gear ratio.

It is possible to compute mathematically the best operating range for each gearing, but of course it is not possible for the driver to follow such computation manually. It is the object of the present invention, to incorporate into the driving mechanism of the vehicle, means to operate said vehicle in accordance with such a computation, so that automatically the invention contemplates to provide means operated preferably in conjunction with throttle mechanism, and means to shift gears when the operation of the vehicle requires gear changes in accordance with the aforementioned computation.

Fig. 3 shows a mechanical means to carry out the invention, and Fig. 4 shows another mechanical means to carry out the invention differently. The method however is the same. Namely, the accelerator or throttle connection operates means to engage high gear at or close to the idling position of the throttle, while the position of the accelerator pedal at or slightly beyond full throttle position operates means to engage a second or lower gearing. I am aware of the fact that overdrives have been used heretofore, but the present invention contemplates to engage such overdrive, and operates same from the idling position of the carburetor and its connected linkage to the wide open position of the carburetor throttle. At wide open position, the invention contemplates shifting gears automatically, induced by that particular throttle position.

The two mechanisms illustrated, provide means whereby the automatic gear shifting in question can only take place while the clutch is disengaged, and requires no other move of the operator than the operation of the accelerating pedal. These mechanisms cause the driver to operate the gear shifts at the proper throttle position since gear shifting is determined by throttle position as indicated above, rather than to use his own judgment in selecting the gears, for the reason that only in this way can the vehicle be operated economically, as previously described.

Fig. 3 shows the accelerator foot pedal 1 which is now customarily used, although the throttle may be operated by hand or by other means, in which case the connection would be made to that means. For the purpose of illustration however, I show the connection arranged to the accelerator foot pedal. 2 connects this foot pedal to throttle arm 30 of the throttle 31 of a carburetor 29. Connection 2 is provided with a tension spring 32 tending to return the throttle to closed position. 3 is a cam fixed to the foot pedal 1, which moves with the foot pedal. Follower 4, provided with the return spring 33, is connected to the valve 5, and valve 5 is connected through pipe line 6 to valve 7, which in turn is connected to the manifold 28 through pipe line 35. It is well known that a vacuum exists in this manifold, varying from two to twenty inches of mercury.

Valve 7 is opened by a connection with the gear shift lever 8, in such a manner that whenever the gear shift lever is in a position for second and high, this valve is open. Whereas, when said lever is in position for low gear, and reverse, the valve 7 is closed, allowing the operator to shift manually into low gear or reverse. This latter mechanism is shown in Fig. 5, where 9 indicates the position of the lever in low gear, 10 in reverse, 11 in high, and 12 in second gear. The shoe 13 is held by the spring 14 against the lever, and is connected through the cable 15 to the valve 7. In the case where valve 7 is in a closed position, it shuts off the entire vacuum mechanism from the main vacuum connection, thus allowing the operator to shift in these two gears manually. When the gear shift lever however is in the positions 11 and 12, or in neutral, the spring 14 opens valve 7, and admits the vacuum to the mechanism.

When foot pedal 1 is in position 16, the follower 4 riding on the cam curve 17, opens valve 5, connecting the vacuum to cylinder 18, which pulls the clutch pedal 27 down, and disengages the clutch. This movement operates valve 26, thus connecting the vacuum to valve 19 which is actuated by the pedal 1 linked directly to the plunger and connected to cylinder 20, thereby shifting the gear shift lever to engage high gear since the pedal 1 raises the plunger in valve 19, thereby connecting valve 26 with the cylinder 20 on the left hand side of the piston therein. If the pedal is in position 21, the car is put in second gear since the valve 19 then connects the other end of cylinder 20 with the valve 26, which is the effect desired. The intent of the driver is always to obtain more acceleration with the pedal in position 21, and to use less power when the pedal is in position 16. Therefore when less power is required, the motor revolutions are reduced, giving better economy, and when more power is required, the motor revolutions are increased, in relation to the driving wheels, giving more power.

It will be noted that the throttle connection is operated from cam 22, by means of the follower 23, this cam having a low spot at 24, and another low spot at 25, which means that the throttle, in positions 24 and 25, is closed, and the engine is under minimum speed in order to permit gear shifting. Accordingly, it will be understood that when it is desired to retain high gear at full opening of the throttle valve 31, the throttle control pedal 1 will not be depressed to its fullest extent, but just short of that point where the cam follower 23 will pass into the low spot 24.

Fig. 4 represents another application of the same method, differing in two ways from that illustrated in Fig. 3. Each of these two variations concerns different items. One of them comprises the fact that the method is used in connection with a two-speed rear axle, and the other one uses, in place of the cams, a linkage, and electrically operated valves, as means for shifting the gears.

1 is the foot accelerator to which is connected by the links 36 and 37, the carburetor throttle arm 30 attached to the throttle valve 31 of the carburetor 29. It may be seen that these two links are hinged in the middle to link 38, and it in turn is hinged to link 39, which pivots around the stationary point 40. Link 39 rests upon a lever arm 41, said arm being part of the clutch pedal 27. If the clutch is either manually operated, or operated by cylinder 42, the links 36 and 37 move downward, and the carburetor throttle arm 30 moves into the idling position 43, because the clutch arm support 41 has dropped into position 44, and the distance between points 45 and 46 was reduced. At the same time the clutch pedal also operates, through the connection 68, the valve 47, which allowed the vacuum from the engine intake manifold 28 through connection 48, to draw on line 49, through the selector valve 50, on the vacuum cylinder 51, thereby shifting the gears (not shown) through the connection 52. The connection 52 (Fig. 4) is attached to the gear shift lever 8 in any suitable manner, such for example as indicated in Fig. 3 relative to the corresponding connection between the piston in cylinder 20 and the gear lever 8. The two-way solenoid 53 is connected through wires 54 with the two-way switch 55, which is also operated from foot pedal 1 equipped with the return spring 57 through the stem of valve 56. Said valve 56 supplies the vacuum to cylinder 42 in two positions of the foot pedal 1, according to the setting of valve 59 controlled by two-way solenoid 58, which shifts the valve 59, by the contacts 60, so that the gear shift 52 always tends to shift in the opposite direction from where the gear was left in the last operation. It may be seen that lines 61 and 62 can be placed in communication so as to apply suction to the cylinder 42, if the valve 59 is in the position shown in Fig. 4, but this operation can only take place when port 63 registers with line 62, that is if the pedal 1 moves in the direction of 64. In this position vent 65 removes the vacuum out of line 66, and if valve 59 is turned the other way, the same vent will remove the vacuum from line 62.

It may be readily understood that when foot pedal 1 is in position 64, the throttle 31 on the throttle arm 30 is in idle position. Valve 63 opens and releases clutch by means of cylinder 42, at the same time closing the left hand contacts 55, which select the proper position of valve 50 by means of lower solenoid 53 before valve 47 is opened by the clutch. When valve 47 opens the piston within the cylinder 51 will move, shift the gears into high, and close the upper contacts 60, which operate the right hand solenoid 58, to shift valve 59 to the opposite position. This then vents line 62 as previously stated, and allows the clutch to re-engage, and throttle to operate normally. Whereas, in the same manner when pedal 1 is in position 67, the engine is in idle position, the clutch is out and cylinder 51 shifts the gear into second or lower speed. In accordance with the power demand of the road, when the foot pedal is in position of 64, the car operates in high gear up to and until the foot pedal reaches position 67, where the clutch is automatically disengaged, which makes linkage 36 and 37 pass into idle position. From there on it becomes inoperable by the foot of the driver, which automatically prevents the stripping of any gears, etc., but as soon as the clutch engages, lever arm 41 pushes linkage 36 and 37 into advance, which opens the carburetor throttle 31, and the driver then has full control over said throttle.

Accordingly, it will be understood that when it is desired to retain high gear at full opening of the throttle valve 31 (Fig. 4), the throttle control pedal 1 will not be depressed to its fullest extent but just short of that point where the switch 55 and valve 56 are actuated. When pedal 1 is allowed to come back into position 64, the car is automatically again in high gear. When the operator has the gear shift in neutral the automatic shift is shut off by the main valve, and only when the operator shifts into high or second manually, can the gear shifting mechanism operate.

In the foregoing, I have described two devices suitable to carry out the invention. I do not limit myself however to these particular means, since there are many variations possible. It is within the scope of my invention to adjust the mechanism to shift into low gear somewhat before maximum throttle position is reached, and into high gear before the absolute minimum or "idling" position is reached, this being a matter of adjustment of the mechanism only.

When I speak of "gearing" or transmission, any means of driving the wheels from the engine is included.

It should be understood that although the invention in its broader aspects may be applied to other machinery than motor vehicles, where similar problems of efficiently accommodating variable loads are encountered, and that although the invention has been disclosed as carried out by the aid of certain specific apparatus, many changes may be made therein without departing from the invention in its broader aspects within the scope of the appended claims.

I claim:

1. An automatic gear selector for automotive vehicles and the like having transmission gearing, an engine throttle control, comprising means to engage and disengage the clutch connecting the engine with the transmission gearing, and means operated by said first-mentioned means for shifting the gearing of the transmission upon the disengagement of the clutch, said last-mentioned means being under the control of said throttle control for selecting a desired gear of said transmission gearing.

2. An automatic gear selector for motor vehicles and the like including a manually operable accelerator pedal connected to the throttle valve in the fuel intake of the motor of said vehicle, a clutch operating mechanism and a gear shifting operating mechanism, valve means operatively connected to said pedal, the clutch operating mechanism and the gear shift operating mechanism, means actuated by the pedal for shifting certain valves of said valve means for initiating operation of the clutch operating mechanism and for setting said gear shift operating mechanism into condition for operation, and means actuated by operation of said clutch operating mechanism to actuate another valve of said valve means for connecting said gear shift operating mechanism to a conduit leading to said fuel intake, and valve means in said conduit under the control of said gear shift operating mechanism for controlling the supply of operating pressure through said valve means and to said operating mechanisms under the control of said pedal.

3. In a motor vehicle and the like having an internal combustion engine, a gear transmission and a clutch connecting the engine and transmission, an accelerator pedal connected to the throttle valve in the fuel intake of said engine, a gear selector including an operating mechanism for said clutch and a shifting mechanism for the gears of said transmission, valve means operated by actuation of said pedal for controlling the operation of said clutch operating mechanism and said gear shift operating mechanism to effect engagement of a relatively high gear of the gears of the transmission from the up-pedal position to the down-pedal position and a relatively low gear at the down-pedal position, means under the control of the pedal when moved from its up to its down position for shifting certain valves of said valve means for initiating operation of the clutch operating mechanism and for setting said gear shift operating mechanism into condition for operation, and means actuated upon operation of the clutch operating mechanism to actuate another valve of said valve means for connecting said gear shift operating mechanism to a conduit leading to said fuel intake, and means controlling the supply of operating pressure from said conduit to said operating mechanisms under the control of said pedal.

4. An automatic gear selector for automotive vehicles and the like provided with a source of vacuum and a throttle control for governing the speed of the engine, comprising a gear shifting device operatively controlled by the inter-action of said throttle control and said source of vacuum in such a manner as to engage a relatively high gearing from minimum throttle control position to maximum throttle control position, and a relatively lower gear at maximum throttle control position, thereby increasing the revolution of the engine relative to the driving wheels when maximum force for propulsion is required and decreasing the engine revolutions relative to the driving wheels when minimum force is required for propulsion.

5. An automatic gear selector, for motor vehicles and the like having transmission gearing and an engine throttle control, operated by the interaction of the engine throttle control and the engine intake suction; said automatic selector comprising means to engage and disengage the clutch connecting the engine with the transmission gearing, and means operated by said first-mentioned means for shifting the gearing of the transmission upon the disengagement of the clutch, said last-mentioned means being selectively controlled by said engine throttle control.

6. An automatic gear selector for automotive vehicles or the like having an engine, a manual throttle control therefor, transmission gearing and a clutch, comprising power actuating means, means for engaging and disengaging said clutch connecting the engine with the driving wheels of said vehicle, and means for selectively shifting said gearing upon the disengagement of the clutch, both of said last two means being controlled by said manual throttle control and actuated by said power means.

ALFRED SCHWARZ.

CERTIFICATE OF CORRECTION.

Patent No. 2,263,400.                                November 18, 1941.

ALFRED SCHWARZ.

It is hereby certified that error appears in the printed specification of the above numbered patent requiring correction as follows: Page 1, second column, line 15, for "weighting" read --weighing--; page 2, first column, line 6, strike out "of 18.6 lbs. or the specific fuel consumption per" and insert instead --26.2 brake effective H. P. for a fuel consumption--; and that the said Letters Patent should be read with this correction therein that the same may conform to the record of the case in the Patent Office.

Signed and sealed this 30th day of December, A. D. 1941.

(Seal)

Henry Van Arsdale,
Acting Commissioner of Patents.